United States Patent [19]
Moody

[11] Patent Number: 5,323,228
[45] Date of Patent: Jun. 21, 1994

[54] CAVITY LENGTH CONTROLLER FOR RING LASER GYROSCOPE APPLICATIONS

[75] Inventor: John H. Moody, Little Falls, N.J.

[73] Assignee: AlliedSignal Inc., Morris Township, Morris County, N.J.

[21] Appl. No.: 688,760

[22] Filed: Apr. 22, 1991

[51] Int. Cl.⁵ .............................................. G01B 9/02
[52] U.S. Cl. .................................................... 356/350
[58] Field of Search ................................... 356/350

[56] References Cited

U.S. PATENT DOCUMENTS

| | | | |
|---|---|---|---|
| 3,484,715 | 12/1969 | Rempel | 331/94.5 |
| 3,581,227 | 5/1971 | Podgorski | 331/94.5 |
| 4,099,876 | 7/1978 | Dorsman | 356/106 LR |
| 4,108,553 | 8/1978 | Zampiello et al. | 356/106 LR |
| 4,113,387 | 9/1978 | Shutt | 356/106 LR |
| 4,160,184 | 7/1979 | Ljung | 310/328 |
| 4,267,478 | 5/1981 | Ljung et al. | 310/315 |
| 4,281,930 | 8/1981 | Hutchings | 356/350 |
| 4,320,974 | 3/1982 | Ljung | 356/350 |
| 4,383,763 | 5/1983 | Hutchings et al. | 356/350 |
| 4,386,853 | 6/1983 | Ljung | 356/350 |
| 4,408,832 | 10/1983 | Hartman et al. | 350/310 |
| 4,488,080 | 12/1984 | Baumann | 310/328 |
| 4,561,780 | 12/1985 | Ljung et al. | 356/350 |
| 4,577,131 | 3/1986 | Soobitsky | 310/328 |
| 4,639,630 | 1/1987 | Rodloff et al. | 310/328 |
| 4,653,919 | 3/1987 | Stjern et al. | 356/350 |
| 4,691,323 | 9/1987 | Ljung et al. | 372/107 |
| 4,824,253 | 4/1989 | Butler et al. | 356/350 |
| 4,836,677 | 6/1989 | Doran et al. | 356/350 |
| 4,847,855 | 7/1989 | Derry et al. | 372/94 |
| 4,915,492 | 4/1990 | Toth | 350/632 |
| 4,933,592 | 6/1990 | Priddy | 310/332 |
| 4,947,399 | 8/1990 | Sheldon et al. | 372/29 |
| 4,969,726 | 11/1990 | Koning | 350/632 |

Primary Examiner—Mark Hellner
Attorney, Agent, or Firm—Donald B. Paschburg; Howard G. Massung

[57] ABSTRACT

A mechanically self-stabilized cavity length controller for use within a ring laser gyroscope, including piezoelectric elements which are employed to move mirrors and effect a change of the laser path length. More particularly, a cavity length controller consisting of component parts fabricated from dissimilar materials, and configured so as to largely cancel any thermally-induced dimensional variations by virtue of the differential thermal expansion rates of the various component parts. The cavity length controller also includes two piezoelectric plates affixed to opposite sides of a deformable diaphragm which is coupled to a mirrored surface within the cavity. To correct for any nominal, thermally-induced cavity variations which might still be evident in a cavity employing the controller, an electrical potential is applied to the piezoelectric plates, causing the radial expansion of one plate and the simultaneous radial contraction of the other, thereby deforming the diaphragm. This deformation results in a corresponding shift in the displacement of the coupled mirrored surface. Such a shift would effectively vary the length of a laser path which included the mirrored surface.

13 Claims, 6 Drawing Sheets

CAVITY LENGTH CONTROLLER FOR RING LASER GYROSCOPE APPLICATIONS

BACKGROUND OF THE INVENTION

The present invention provides a mechanically self-stabilized cavity length controller for use within a ring laser gyroscope, including piezoelectric elements which are employed to move mirrors and effect a change of the laser path length. More particularly, a cavity length controller consisting of component parts fabricated from dissimilar materials, and configured so as to largely cancel any thermally-induced dimensional variations by virtue of the differential thermal expansion rates of the various component parts. The cavity length controller also includes two piezoelectric plates affixed to opposite sides of a deformable diaphragm which is coupled to a mirrored surface within the cavity. To correct for any nominal, thermally-induced cavity variations which might still be evident in a cavity employing the controller, an electrical potential is applied to the piezoelectric plates, causing the radial expansion of one plate and the simultaneous radial contraction of the other, and thereby deforming the diaphragm. This deformation results in a corresponding shift in the displacement of the coupled mirrored surface, effectively varying the length of the cavity which includes that mirrored surface.

Ring laser gyroscopes measure rates of rotation by detecting phase shifts in two counter-rotating beams of laser light within a cavity having a length equal to an integral number of wavelengths of the laser light being used. The cavity would include a lasing element, a light sensing element, and an arrangement of mirrors for directing the laser light into a closed path or "ring" within the cavity. The difference in travel time around the cavity for each of the beams (which is indicated by the number of phase shifts detected by the light sensing element) is directly proportional to the rotation of the cavity. This rotation-induced travel time difference is known as the Sagnac Effect. In order to insure that accurate measurements of rotation can be made with such a gyroscope, it is important that the distance which the beams travel around the cavity (the cavity length) be maintained constant to within about 0.001 of the wavelength of the laser light being used (a typical laser gyroscope employs a laser having a wavelength on the order of 600 nm).

The majority of modern ring laser gyroscope cavities are fashioned from ceramic glasses having extremely low coefficients of thermal expansion ("CTE"). Mirrors are placed within the cavity to direct the laser light into a closed path. While the use of low CTE glass minimizes the effect of temperature cycling upon the physical dimensions of the cavity, it does not eliminate it. It is therefore necessary to vary the positions of the mirrors within the cavity so as to compensate for the expansion and contraction of the cavity, and maintain a constant path length for the laser.

Cavity Length Controllers ("CLCs") are devices which alter the position of one or more of the mirrors contained within a ring laser gyroscope, and thereby introduce a controlled change in the cavity length. This cavity length adjustment has been effected in previous CLCs through the application of a direct current ("DC") voltage across a piezoelectric element. This element, which expands or contracts in response to applied voltages, would be coupled to cause the translation of a mirrored surface within the cavity and thereby produce a specific change in the cavity length. The applied voltage would then be adjusted to effect changes in the cavity length which would cancel thermally-induced cavity variations. In addition to the DC voltage applied across the piezoelectric element of a CLC, an alternating current ("AC") voltage is also typically applied. The AC voltage modulates the mirror controlled by the CLC about the position selected by the DC voltage. This positional modulation provides an error signal which is used to maintain the path length at a constant.

Ironically, one of the prime sources of thermally-induced cavity length variation has been the CLCs themselves. Prior art CLCs have typically contained components fabricated from materials having a higher CTE than the ceramic glasses which make up the remainder of the cavity. This increased length variation has made it necessary for the CLCs to compensate for greater distances, which for piezoelectric CLCs translates into a higher voltage being required for application to the piezoelectric element within them.

In a typical square laser cavity employing two prior art CLCs (such as ones having the configuration disclosed by U.S. Pat. No. 4,836,677), potentials in excess of 200 V would have to be applied to each of the CLCs in order to compensate for cavity length variations over a −55° C. to +70° C. temperature range. This type of high-voltage requirement has limited the temperature ranges over which laser gyroscopes employing prior art CLCs could reliably operate (as many applications of ring laser gyroscopes are in vehicles or weapon systems, available power is usually at a premium). In addition, since the amount of thermal expansion of a laser cavity is directly proportional to the size of the cavity, limitations which these high-voltage requirements place upon achievable mirror displacement have prohibited the application of piezoelectric CLCs in larger laser cavities.

Accordingly, it is the object of the present invention to provide for a piezoelectric CLC which exhibits high dimensional stability over a wide range of temperatures, thus reducing the need for large mirror displacements, and associated high-voltages that need be applied to the CLC in order to effect them. This will allow CLCs having the invention's configuration to maintain a constant path length within a laser cavity over a greater range of temperature for any given voltage restriction, and to be implemented in laser cavities of almost any size.

SUMMARY OF THE INVENTION

The present invention provides a mechanically self-stabilized CLC, including piezoelectric elements employed to position a mirror, and consisting of component parts fabricated from dissimilar materials, configured so as to largely cancel any thermally-induced dimensional variations by virtue of the differential thermal expansion rates of those component parts. In a preferred embodiment the CLC consists of a circular alloy base housing (having a perimetric support rim, and an aperture at its center), two piezoelectric plates (each having an aperture at its center), a threaded alloy stud (fabricated from an alloy having a different CTE than the alloy from which the base housing was fabricated), an nut (fabricated from the same alloy as the base housing), a circular ceramic glass mirror diaphragm housing (having a perimetric support rim, a raised center platform, and a mirrored outer surface), and a circular ceramic glass backing plate.

The piezoelectric elements are each concentrically affixed to an opposing face of the base housing. The backing plate is concentrically affixed to the perimetric support rim and center platform of the mirror diaphragm housing, and the head of the stud is bonded to the center of the backing plate. This mirror diaphragm/plate/stud assembly is then concentrically mounted upon the perimetric support rim of the base housing so that the threaded portion of the stud protrudes through the apertures in that housing and the attached piezoelectric plates. The nut is tightened down upon the threaded stud, thereby applying a tension to the backing plate and mirror diaphragm housing. This tension causes the center of the mirror diaphragm housing's face to be pulled toward the base housing and deformed.

The ceramic glass from which the backing plate and mirror diaphragm housing are fabricated may have either a positive or negative CTE (depending upon the particular type of glass used). In the case where a ceramic glass with a positive CTE is employed, the base housing and nut should be fabricated from a nickel-iron alloy, and the stud from an iron-nickel-cobalt alloy. If the mirror diaphragm housing and backing plate were fabricated from a ceramic glass with a negative CTE, the base housing and nut should be fabricated an from iron-nickel-cobalt alloy, and a nickel-iron alloy stud should be employed. Typically, an iron-nickel-cobalt alloy will exhibit a CTE on the order of 3.5 times that of a nickel-iron alloy. This disparity in expansion/contraction rates, in conjunction with the different rates of heat propagation throughout the CLC, tends to cause any thermally-induced dimensional variation in one component to be compensated for by the thermally-induced dimensional variations of the others.

Any residual thermally-induced variations in the position of the mirrored face of the CLC can be compensated for by the application of DC voltages across the two piezoelectric plates. If a positive potential is applied to the plates, the plate closer to the mirror diaphragm housing radially expands, and the plate farthest from that housing radially contracts. The forces exerted by the plates upon the base housing to which they are attached causes that housing to deform toward the mirror diaphragm housing (in a manner similar to that of the bottom of an oil can upon being depressed). This deformation of the base housing lessens the tension applied to the mirror diaphragm housing via the stud and backing plate, thereby allowing that housing to return to a more relaxed position. Conversely, a negative potential could be simultaneously applied to the exposed faces of both piezoelectric plates, which would cause the radial contraction of the plate closest to the mirror diaphragm housing, and the radial expansion of the plate farthest from the mirror diaphragm housing. This would deform the base housing away from the plane of the mirror diaphragm housing and increase the tension applied to the mirror diaphragm housing via the stud and backing plate, thereby causing the center of that housing to be pulled farther away from it initial position.

The position of the center of the mirror diaphragm housing's face is a direct function of the amplitude of the potentials applied across the CLC's piezoelectric elements; allowing control of the mirrored outer surface of that housing (and therefore control over the length of a cavity which includes that mirrored surface as a component) to be maintained through the simple variation of two voltages.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which.

DETAILED DESCRIPTION OF THE INVENTION

A preferred embodiment of the CLC is shown in FIGS. 1A, 1B, 1C, 1D and 1E. It includes a circular mirror diaphragm housing 1, which should be fabricated from a low expansion ceramic glass having a positive CTE. Two such materials are Zerodur ™, manufactured by Schott Glaswerke of Mainz, Germany, and Corning 9600, manufactured by Corning Glass Works, Corning, New York. The housing has an outer planar face with a reflective coating 2, and an inner face with a raised center platform 3 and a raised perimetric rim 4. One side of a circular backing plate 5, which should also be fabricated from a low-expansion ceramic glass, is attached concentrically to the center platform and perimetric rim of the mirror diaphragm housing. The head of a threaded stud 6 is bonded to the exposed face of the backing plate at its center. This stud should be fabricated from an iron-nickel-cobalt alloy (such as the commercially available Kovar ™, which has a CTE of approximately 5.1 ppm/° C.).

Figure 1A:
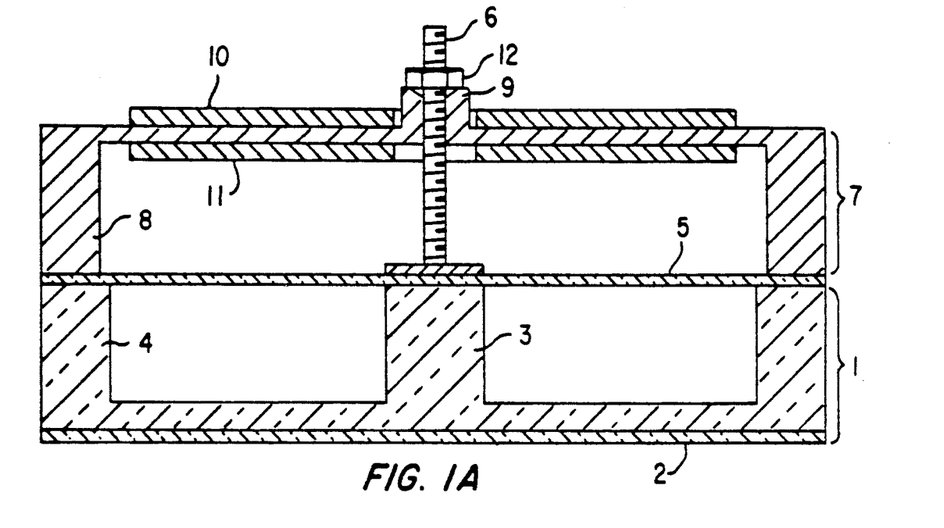
FIG. 1A is a side cross-sectional view of a cavity length controller which has as its components a circular base housing, two circular piezoelectric plates, a threaded stud, a nut, a circular backing plate, and a circular mirror diaphragm housing.
Figure 1B:
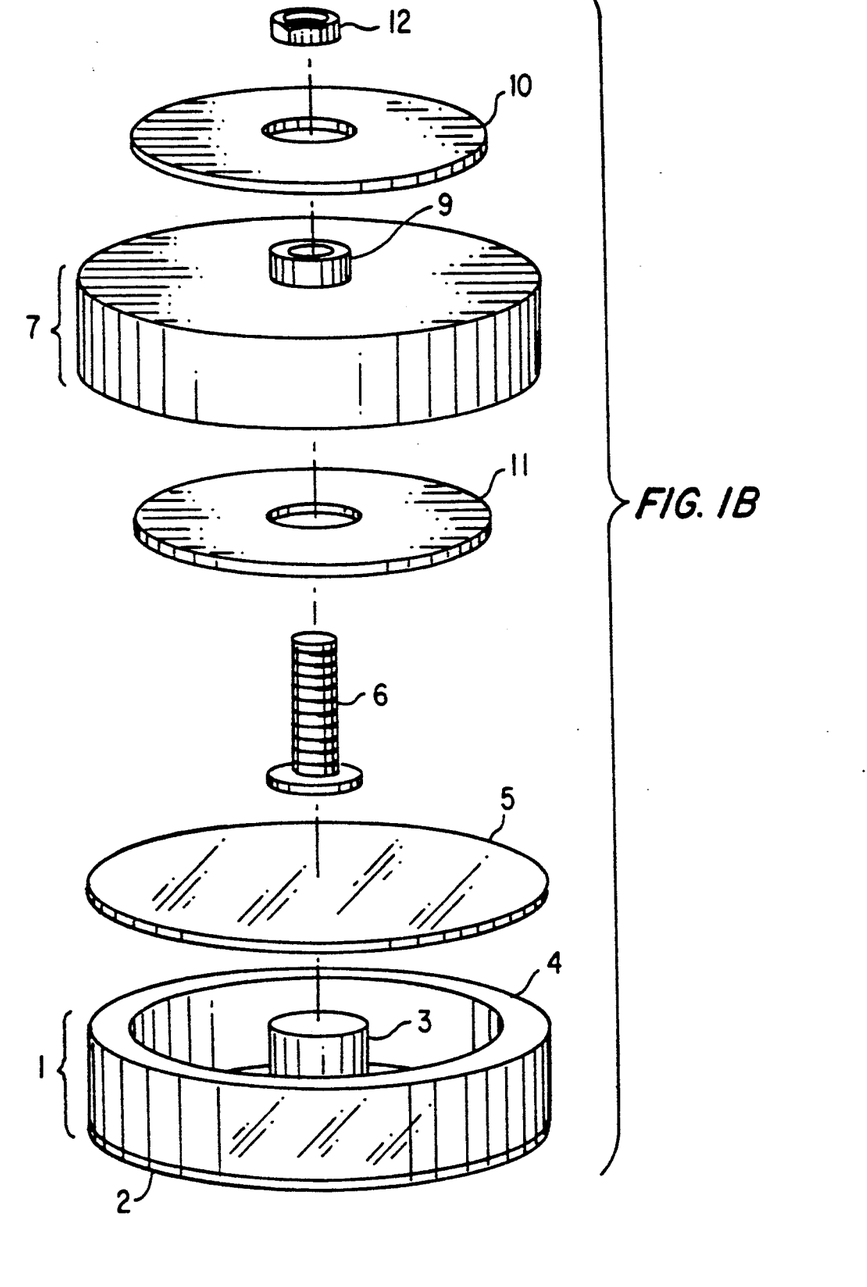
FIG. 1B is an exploded perspective view of the cavity length controller of FIG. 1A.

Adjoining the backing plate is a circular base housing 7 fabricated from a nickel-iron alloy (such as the commercially available Invar ™, which has a CTE of approximately 1.4 ppm/° C.). The housing has an inner planar face with a support rim 8 rising from its perimeter, and an outer planar face with a support ring 9 rising from its center. An aperture, having a diameter larger than that of the stud shaft, is located at the center of the housing.

Two circular, planar piezoelectric elements 10, 11 are affixed to the base housing, one to each of its faces, in a manner which effects both an electrical and a mechanical contact between that housing and the elements. Each of these elements has an aperture at its center which is slightly larger than the outer diameter of the support ring. The thickness of these elements should be less than the height which the support ring rises above the outer planar surface of the base housing. The elements are fabricated from a polarized himorphic piezoelectric material (such as EC-70 manufactured by EDO Corporation of Salt Lake City, Utah) which radially expands and contracts in response to a potential applied across it. The polarity of the potential applied across the material determines if the material will expand or contract (i.e., a positive potential applied to "+" side of the material will cause expansion, while a negative potential applied to the "+" side of the material will cause contraction). The amount of expansion or contraction being proportional to the amplitude of the applied potential. The elements are affixed to the faces of the housing in an orientation which causes the element 10 (affixed to the outer face of the housing) to contract when a positive potential is applied to its exposed face, and the element 11 (affixed to the inner face of the housing) to expand when a positive voltage is applied to its exposed face. The base housing itself serves to provide a common potential to the faces of the piezoelectric elements in contact with it.

The threaded shaft of the stud passes through the apertures in the base housing and the piezoelectric elements. A nickel-iron alloy nut 12, having an outside dimension larger than that of the inside diameter of the support ring, is tightened down over the threaded stud so that it contacts the support ring.

Tightening the nut causes a force in the direction of the base housing to be applied to the center of the backing plate and the center platform of the mirror diaphragm housing. This causes the formerly planar face of the mirror diaphragm housing to be deformed so that the central portion of the face is drawn closer to the base housing. This tension-induced deformation of the CLC, which is referred to as preloading, puts the CLC in its initial operating position. The CLC should be preloaded to a deformation greater than a distance X (illustrated in FIG. 1C), which approximates the maximum distance over which it is desired to translate the reflectively coated surface of the mirror diaphragm housing. The dotted line A in FIG. 1C indicates the initial unloaded, pre-deformation position of the face of the mirror diaphragm housing.

Figure 1C:
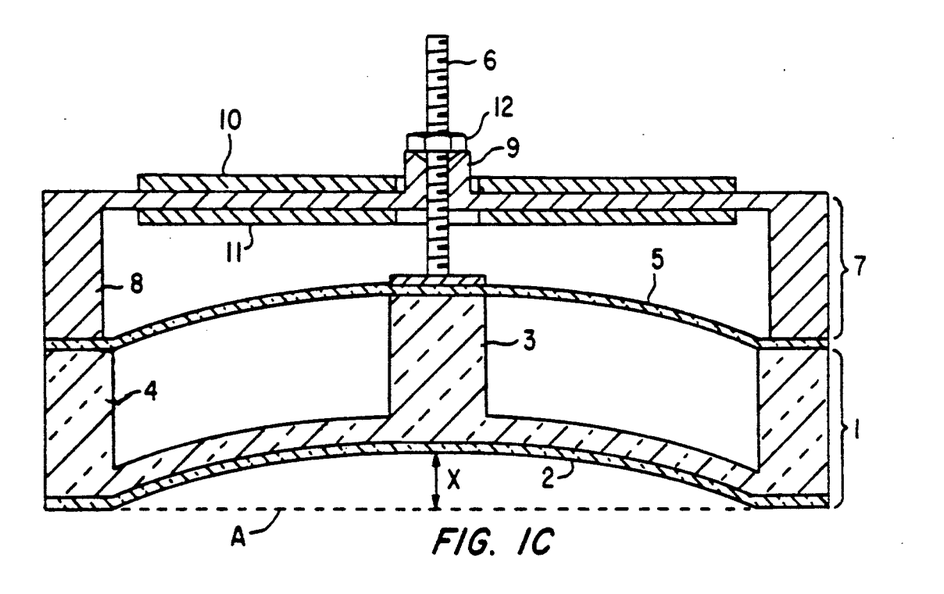
FIG. 1C is a side cross-sectional view of the cavity length controller of FIG. 1A in the preloaded, unenergized state.

Thermally-induced variations from this preloaded position are minimized as a result of the dissimilar CTEs of the CLC's component parts. While the ceramic glass backing plate and mirror diaphragm housing will exhibit an almost negligible dimensional variation as temperature is varied, the nickel-iron alloy base housing and nut will expand or contract at a rate of approximately 1.4 ppm/° C., while the iron-nickel-cobalt alloy stud will exhibit a rate of expansion or contraction of approximately 5.1 ppm/° C. This disparity in expansion/contraction rates, in conjunction with the different rates of heat propagation throughout the CLC, tends to cause any thermally-induced dimensional variation in one component to be compensated for by the thermally-induced dimensional variations of the other components.

Figure 1D:
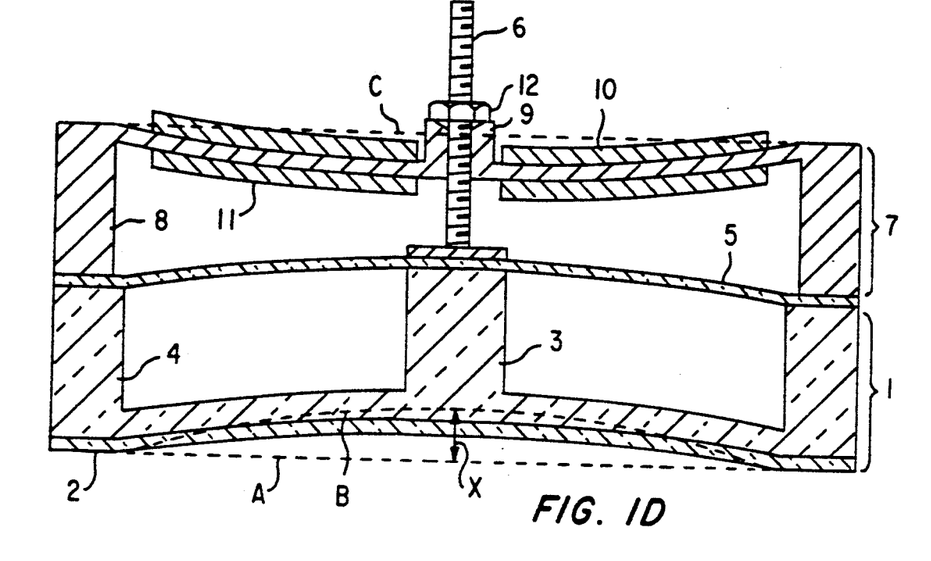
FIG. 1D is a side cross-sectional view of the cavity length controller of FIG. 1A in a reduced tension, energized state.

Any remaining thermally-induced fluctuation in the position of the central portion of the mirror diaphragm housing face may be adjusted by the application of electrical potentials across the two piezoelectric elements. Simultaneously applying a positive voltage to the exposed face of each of the piezoelectric elements (relative to the base housing) will cause the element affixed to the inner face of the base housing to radially expand and the element affixed to the outer face of the base housing to radially contract. The net result of the forces exerted upon the base housing by the energized piezoelectric elements is the deformation of that housing in a manner where the central portion of its face is translated toward the mirror diaphragm housing (the deformation is similar to that of the bottom of an oil can upon being depressed). This translation causes a reduction of the tension on the threaded stud, thereby allowing the mirror diaphragm housing to return to a more relaxed position. This effectively causes the translation of the central portion of the face of that diaphragm housing outward, away from the initial, unenergized plane of the base housing. FIG. 1D shows a CLC in this semi-relaxed, energized state. The dotted line A indicates the initial unloaded, pre-deformation position of the face of the mirror diaphragm housing, while dotted line B indicates the preloaded, unenergized position of that face. Dotted line C indicates the initial, unenergized position of the base housing's face.

Figure 1E:
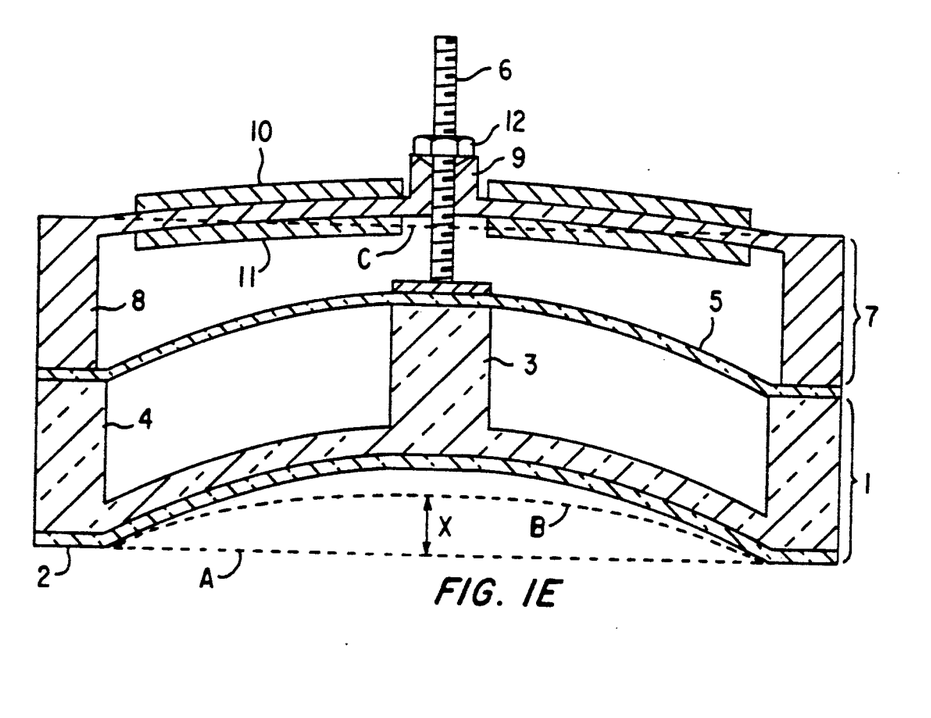
FIG. 1E is a side cross-sectional view of the cavity length controller of FIG. 1A in an increased tension, energized state.

Conversely, simultaneously applying a negative voltage to the exposed face of each of the piezoelectric elements (with the base housing serving as a ground) will cause the element affixed to the inner face of the base housing to radially contract and the element affixed to the outer face of the base housing to radially expand. This results in the deformation of the base housing in a manner where the central portion of its face is translated away from the mirror diaphragm housing. This translation causes the tension on the threaded stud to increase, thereby causing the translation of the central portion of the face of that diaphragm housing inward, toward the initial, unenergized plane of the base housing. FIG. 1E shows a CLC in this increased tension, energized state. The dotted line A indicates the initial unloaded, pre-deformation position of the face of the mirror diaphragm housing, while dotted line B indicates the preloaded, unenergized position of that face. Dotted line C indicates the initial, unenergized position of the base housing's face.

Figure 2:
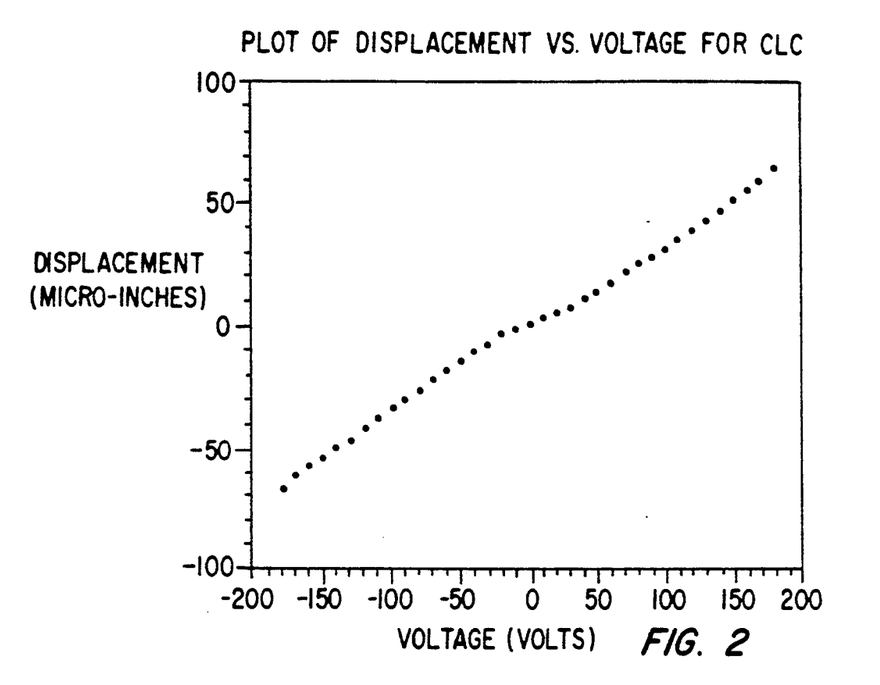
FIG. 2 is a graph showing the deflection of the cavity length contoller of FIG. 1A as a function of the potential applied across the piezoelectric lie elements.
Figure 3:
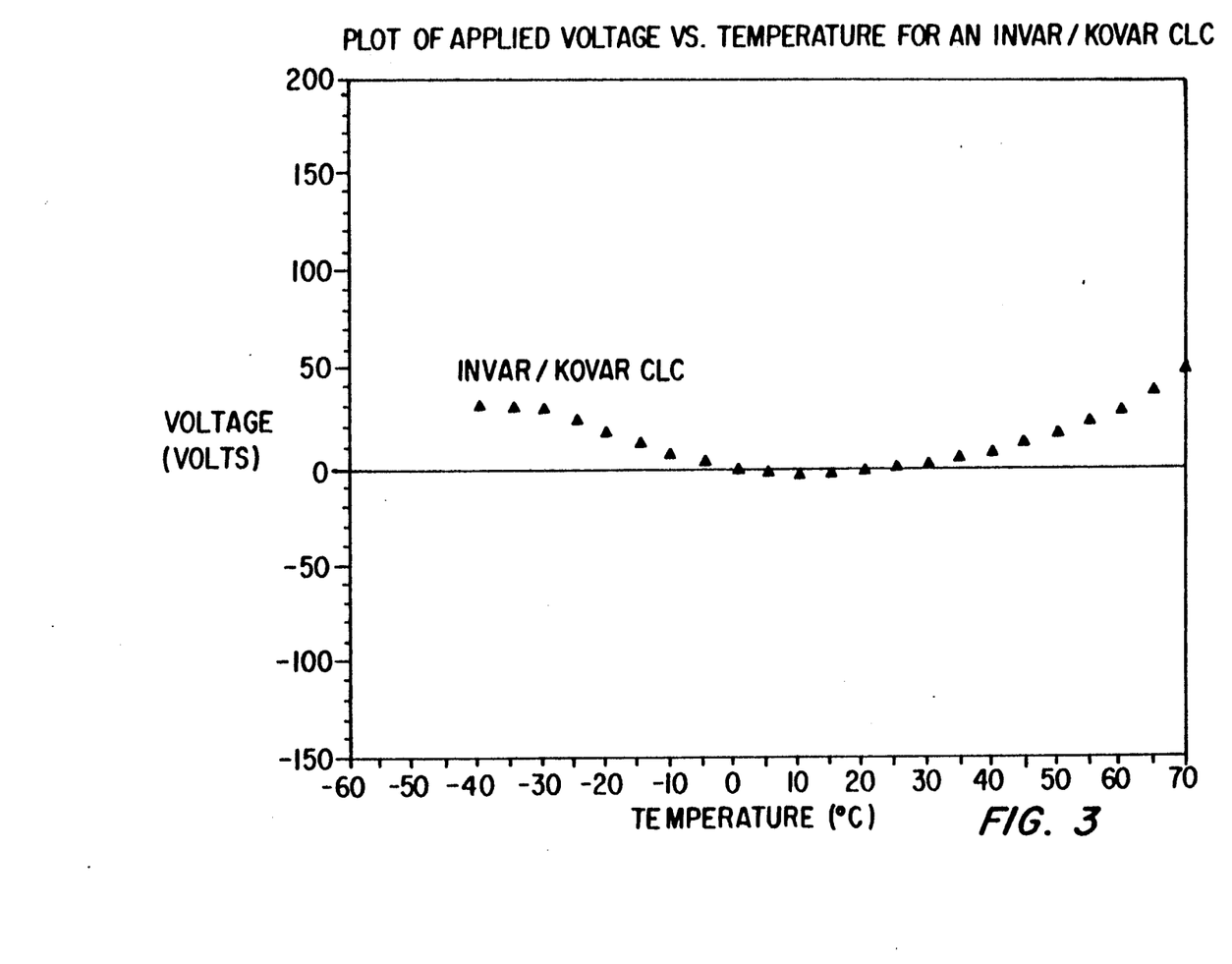
FIG. 3 is a graph showing the polarity and amplitude of the applied potential required to maintain a constant path length over temperature within a square 34 cm cavity which contains two cavity length controllers like that of FIG. 1A.

The deformation of the base housing, and therefore the amount of translation of the central portion of the reflective face of the mirror diaphragm housing, is a direct function of the amplitude of the potential applied across the piezoelectric elements. This facilitates the positional control of the central portion of the mirror diaphragm housing's reflective face (and therefore control over the length of a cavity which includes that reflective face as a component) via the variation of the amplitude of the potential applied to the piezoelectric elements. FIG. 2 is a graph of the deflection of the central portion of the mirrored surface as a function of potential applied across the piezoelectric elements for a CLC of the configuration described above. FIG. 3 is a graph showing the required polarity and amplitude of the applied potential to maintain a constant path length within a square 34 cm cavity containing two such CLCs, as the cavity and the CLCs are temperature cycled. In the case of both FIG. 2 and FIG. 3, like potentials were applied to both of the piezoelectric elements in each CLC.

A second embodiment of the invention has the same basic configuration as the previously described embodiment, but is fabricated from different materials. The mirror diaphragm housing and backing plate would be fabricated from a low expansion ceramic glass having a negative CTE, the base housing and nut would be fabricated from an iron-nickel-cobalt alloy, and the threaded stud would be fabricated from a nickel-iron alloy. The operation of this second embodiment would be identical to that described for the first embodiment.

Figure 4A:
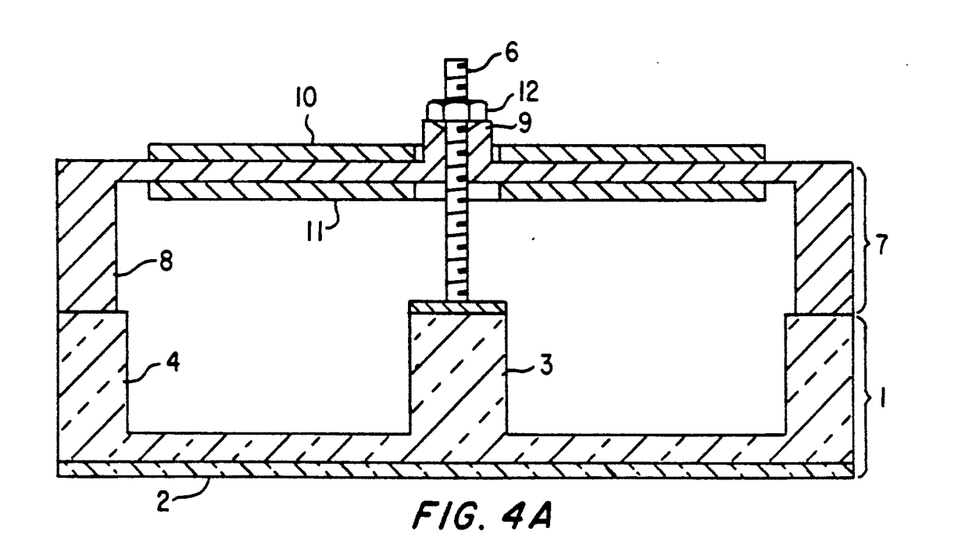
FIG. 4A is a side cross-sectional view of a cavity length controller which has as its components a circular base housing, two circular piezoelectric plates, a threaded stud, a nut, and a circular mirror diaphragm housing.
Figure 4B:
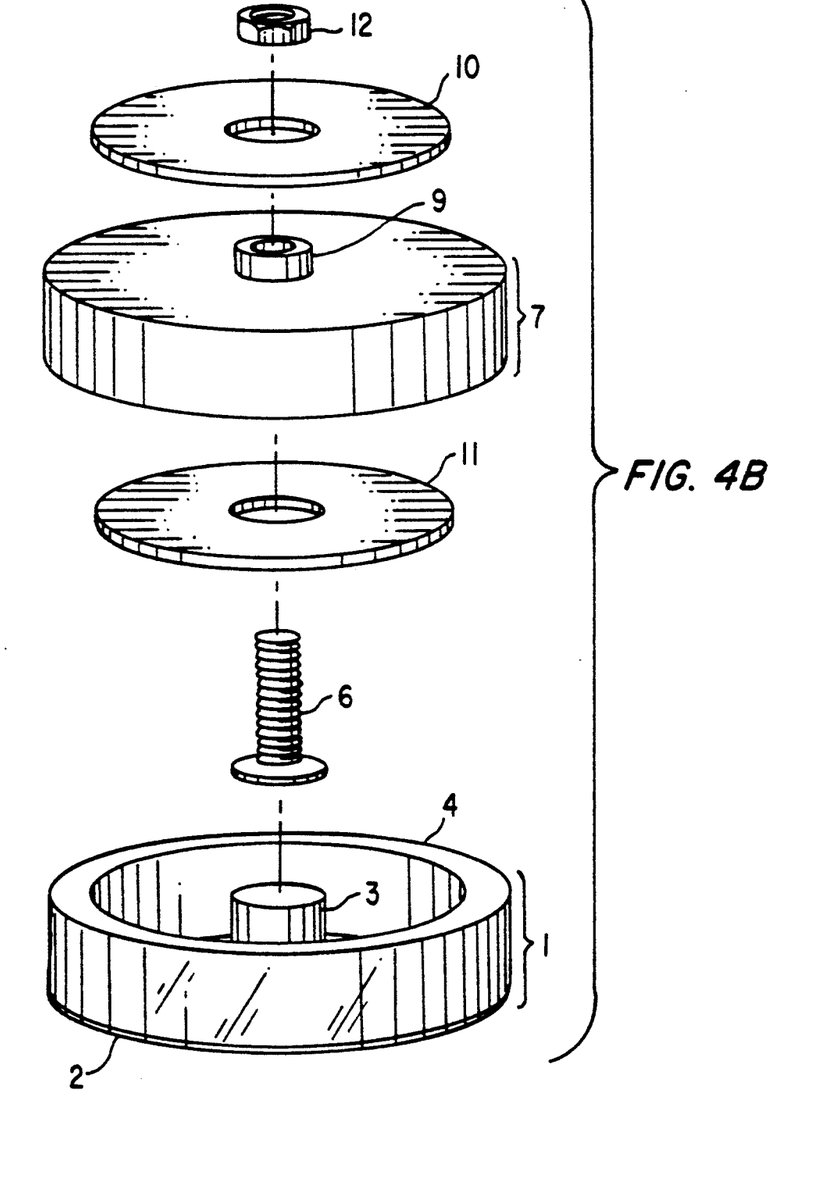
FIG. 4B is an exploded perspective view of the cavity length controller of FIG. 4A.

A third embodiment of the invention, illustrated in FIGS. 4A and 4B, is basically identical to the first embodiment, except that it does not have a backing plate adjoining the mirror diaphragm housing. In this embodiment, the head of the threaded stud is bonded directly to the raised center platform of the mirror diaphragm housing, and the perimetric rim of that housing is joined directly to the perimetric rim of the base housing. This third embodiment operates in the same fashion as the first embodiment, although it is not as dimensionally stable over temperature as that first embodiment.

Yet another embodiment of the invention has the same basic configuration as the third embodiment, but is fabricated from different materials. The mirror diaphragm housing would be fabricated from a low expansion ceramic glass having a negative CTE, the base housing and nut would be fabricated from an iron-nickel-cobalt alloy, and the threaded stud would be fabricated from a nickel-iron alloy. This third embodiment operates in a the same fashion as the first embodiment, although it is not as dimensionally stable over temperature as that first embodiment.

In comparison to prior art piezoelectric CLCs, the embodiments disclosed above provide for significantly reduced dimensional variations as a function of temperature, and therefore require only a minimal voltage to be applied to the piezoelectric elements to maintain the length of a cavity in which they are employed. For example, the embodiment illustrated in FIGS. 1A–1D, requires a potential varying over the range from −10 V to +60 V to maintain a constant of cavity length for a 34 cm cavity over the temperature range of −55° C. to +70° C. (assuming two such CLCs are employed as corner mirrors within a square ceramic glass cavity). Whereas to maintain the same 34 cm cavity length employing CLCs which are not fabricated from dissimilar materials (i.e., having a base housing, stud and nut all fabricated from the same alloy, such as nickel-iron), would require the application of voltages ranging from −100 V to +200 V.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. A ring laser cavity length controller comprising:
a flexible mirror support housing having a mirrored rear surface and a planar front surface, both surfaces being normal to an axis along which mirror deflection occurs, said front surface having a raised center platform and raised perimetric wall, both raised portions being capable of conveying axial forces to the normal surface of the housing;
a flexible planar backing plate, having a front and a rear surface, said rear surface being attached to both the raised perimetric wall and the raised center platform of the flexible mirror support housing, so that the planar surfaces of the backing plate are positioned normal to the axis along which mirror defection occurs;
a flexible base housing having a planar front and a planar rear surface, and said rear surface having a raised perimetric wall capable of conveying axial forces to the normal surface of the base housing, said raised perimetric wall being affixed to the front surface of the backing plate so that the planar surfaces of the base housing are positioned normal to the axis along which mirror deflection occurs, and so that the axis along which mirror deflection occurs passes through the center of those planar surfaces;
a first planar piezoelectric element, affixed to the rear surface of the base housing so that the plane of the element is normal to the axis along which mirror deflection occurs, said piezoelectric element positioned so that the application of a voltage across the element effects a change in the dimensions of the element in a plane normal to the axis along which mirror deflection occurs;
a second planar piezoelectric element affixed to the front surface of the base housing so that the plane of the element is normal to the axis along which mirror deflection occurs, said piezoelectric element positioned so that the application of a voltage across the element effects a change in the dimensions of the element in a plane normal to the axis along which mirror deflection occurs;
a tensioning means attached to the center of the front surface of the backing plate and coupled to the center of the front surface of the base housing via an anchoring means, said tensioning means applying a preload tension, along the axis of mirror deflection, between the backing plate and the base housing causing the planar portion of the mirror support housing to deform so that its center is translated along the axis of mirror deflection toward the planar portion of the base housing;
the base housing and anchoring means being fabricated from a material having a different coefficient of thermal expansion than the material from which the tensioning means is fabricated, so that the differential in the expansion rates of these components tends to negate thermally-induced dimensional variations in the overall cavity length controller assembly;
means for applying a potential across the first and second piezoelectric elements effecting the expansion of one of said elements, and the contraction of the other, said expansion and contraction inducing the deformation of the planar portion of the base housing so that the tension communicated via the tensioning means and backing plate between the base housing and the center portion of the mirror housing is changed, and the center portion of the mirror support housing is translated along the axis of mirror deflection.

2. The cavity length controller of claim 1 wherein the mirror support housing and the backing plate are fabricated from a low-expansion ceramic glass having a positive coefficient of thermal expansion, the base housing and anchoring means are fabricated from a nickel-iron alloy, and the tensioning means is fabricated from an iron-nickel-cobalt alloy.

3. The cavity length controller of claim 1 wherein the mirror support housing and the backing plate are fabricated from a low-expansion ceramic glass having a negative coefficient of thermal expansion, the base housing and anchoring means are fabricated from an iron-nickel-cobalt alloy, and the tensioning means is fabricated from a nickel-iron alloy.

4. A ring laser cavity length controller comprising:
a flexible mirror support housing having a mirrored rear surface and a planar front surface, both surfaces being normal to an axis along which mirror deflection occurs, said front surface having a raised center platform and raised perimetric wall, both raised portions being capable of conveying axial forces to the normal surface of the housing;
a flexible base housing having a planar front and a planar rear surface, and said rear surface having a raised perimetric wall capable of conveying axial forces to the normal surface of the base housing, said raised perimetric wall being affixed to the perimetric wall of the mirror support housing so that the planar surfaces of the base housing are positioned normal to the axis along which mirror defection occurs, and so that the axis along which mirror deflection occurs passes through the center of those planar surfaces;
a first planar piezoelectric element, affixed to the rear surface of the base housing so that the plane of the element is normal to the axis along which mirror deflection occurs, said piezoelectric element positioned so that the application of a voltage across the element effects a change in the dimensions of the element in a plane normal to the axis along which mirror deflection occurs;
a second planar piezoelectric element affixed to the front surface of the base housing so that the plane of the element is normal to the axis along which mirror deflection occurs, said piezoelectric element positioned so that the application of a voltage across the element effects a change in the dimensions of the element in a plane normal to the axis along which mirror deflection occurs;
a tensioning means attached to the center of the front surface of the backing plate and coupled to the center of the front surface of the base housing via an anchoring means, said tensioning means applying a preload tension, along the axis of mirror deflection, between the backing plate and the base housing which causes the planar portion of the mirror support housing to deform so that its center is translated along the axis of mirror deflection toward the planar portion of the base housing;
the base housing and anchoring means being fabricated from a material having a different coefficient of thermal expansion than the material from which the tensioning means is fabricated, so that the differential in the expansion rates of these components tends to negate thermally-induced dimensional variations in the overall cavity length controller assembly;
means for applying a potential across the first and second piezoelectric elements effecting the expansion of one of said elements, and the contraction of the other, said expansion and contraction inducing the deformation of the planar portion of the base housing so that the tension communicated via the tensioning means between the base housing and the center portion of the mirror housing is changed, and the center portion of the mirror support housing is translated along the axis of mirror deflection.

5. The cavity length controller of claim 4 wherein the mirror support housing is fabricated from a low-expansion ceramic glass having a positive coefficient of thermal expansion, the base housing and anchoring means are fabricated from a nickel-iron alloy, and the tensioning means is fabricated from an iron-nickel-cobalt alloy.

6. The cavity length controller of claim 4 wherein the mirror support housing is fabricated from a low-expansion ceramic glass having a negative coefficient of thermal expansion, the base housing and anchoring means are fabricated from an iron-nickel-cobalt alloy, and the tensioning means is fabricated from a nickel-iron alloy.

7. A ring laser cavity length controller comprising:
a flexible mirror support housing having a mirrored rear surface and a planar front surface, both surfaces being normal to an axis along which mirror deflection occurs, said front surface having a raised center platform and raised perimetric wall, both raised portions being capable of conveying axial forces to the normal surface of the housing;
a flexible planar backing plate, having a front and a rear surface, said rear surface being attached to both the raised perimetric wall and the raised center platform of the flexible mirror support housing, so that the planar surfaces of the backing plate are positioned normal to the axis along which mirror defection occurs;
a stud having a planar head and a threaded axial shaft normal to the head, said head being bonded to the center of the front surface of the backing plate so that the axis of the shaft lies on the axis along which mirror deflection occurs;
a flexible base housing having a center aperture, a planar front surface, and a planar rear surface, said aperture being sufficiently large so as to allow the stud shaft to freely pass through it, said front surface having a raised support ring concentric to the aperture capable of conveying axial forces to the normal surface of the base housing, said rear surface having a raised perimetric wall capable of conveying axial forces to the normal surface of the base housing, and said raised perimetric wall being affixed to the raised perimetric wall of the mirror support housing so that the planar surfaces of the base housing are positioned normal to the axis along which mirror defection occurs, and so that the stud shaft passes through the center aperture of the base housing;
a first planar piezoelectric element, having a center aperture sufficiently large so as to allow the stud shaft to freely pass through it, affixed to the rear surface of the base housing so that the plane of the element is normal to the axis along which mirror deflection occurs, said piezoelectric element positioned so that the application of a voltage across the element effects a change in the dimensions of the element in a plane normal to the axis along which mirror deflection occurs;
a second planar piezoelectric element, having a center aperture sufficiently large so as to allow the raised support ring to freely pass through it, affixed to the front surface of the base housing so that the plane of the element is normal to the axis along which mirror deflection occurs, said piezoelectric element positioned so that the application of a voltage across the element effects a change in the dimensions of the element in a plane normal to the axis along which mirror deflection occurs;

a nut mated to the shaft of the stud and tightened down so as to contact the support ring and apply a preload tension, via the shaft, between the base housing and the backing plate which causes the planar portion of the mirror support housing to deform so that its center is translated along the axis of mirror deflection toward the planar portion of the base housing;

the base housing and nut being fabricated from a material having a different coefficient of thermal expansion than the material from which the stud is fabricated, so that the differential in the expansion rates of these components tends to negate thermally-induced dimensional variations in the overall cavity length controller assembly;

means for applying a potential across the first and second piezoelectric elements effecting the expansion of one of said elements, and the contraction of the other, said expansion and contraction inducing the deformation of the planar portion of the base housing so that the tension communicated via the stud and the backing plate between the base housing and the center portion of the mirror housing is changed, and the center portion of the mirror support housing is translated along the axis of mirror deflection.

8. The cavity length controller of claim 7 wherein the mirror support housing and the backing plate are fabricated from a low-expansion ceramic glass having a positive coefficient of thermal expansion, the base housing and nut are fabricated from a nickel-iron alloy, and the stud is fabricated from an iron-nickel-cobalt alloy.

9. The cavity length controller of claim 7 wherein the mirror support housing and the backing plate are fabricated from a low-expansion ceramic glass having a negative coefficient of thermal expansion, the base housing and nut are fabricated from an iron-nickel-cobalt alloy, and the stud is fabricated from a nickel-iron alloy.

10. A ring laser cavity length controller comprising:
a flexible mirror support housing having a mirrored rear surface and a planar front surface, both surfaces being normal to an axis along which mirror deflection occurs, said front surface having a raised center platform and raised perimetric wall, both raised portions being capable of conveying axial forces to the normal surface of the housing;

a stud having a planar head and a threaded axial shaft normal to the head, said head being bonded to the center raised platform of the mirror support housing so that the axis of the shaft lies on the axis along which mirror deflection occurs;

a flexible base housing having a center aperture, a planar front surface, and a planar rear surface, said aperture being sufficiently large so as to allow the stud shaft to freely pass through it, said front surface having a raised support ring concentric to the aperture capable of conveying axial forces to the normal surface of the base housing, said rear surface having a raised perimetric wall capable of conveying axial forces to the normal surface of the base housing, and said raised perimetric wall being affixed to the raised perimetric wall of the mirror support housing so that the planar surfaces of the base housing are positioned normal to the axis along which mirror defection occurs, and so that the stud shaft passes through the center aperture of the base housing;

a first planar piezoelectric element, having a center aperture sufficiently large so as to allow the stud shaft to freely pass through it, affixed to the rear surface of the base housing so that the plane of the element is normal to the axis along which mirror deflection occurs, said piezoelectric element positioned so that the application of a voltage across the element effects a change in the dimensions of the element in a plane normal to the axis along which mirror deflection occurs;

a second planar piezoelectric element, having a center aperture sufficiently large so as to allow the raised support ring to freely pass through it, affixed to the front surface of the base housing so that the plane of the element is normal to the axis along which mirror deflection occurs, said piezoelectric element positioned so that the application of a voltage across the element effects a change in the dimensions of the element in a plane normal to the axis along which mirror deflection occurs;

a nut mated to the shaft of the stud and tightened down so as to contact the support ring and apply a preload tension, via the shaft, between the base housing and the mirror support housing which causes the planar portion of the mirror support housing to deform so that its center is translated along the axis of mirror deflection toward the planar portion of the base housing;

the base housing and nut being fabricated from a material having a different coefficient of thermal expansion than the material from which the stud is fabricated, so that the differential in the expansion rates of these components tends to negate thermally-induced dimensional variations in the overall cavity length controller assembly;

means for applying a potential across the first and second piezoelectric elements effecting the expansion of one of said elements, and the contraction of the other, said expansion and contraction inducing the deformation of the planar portion of the base housing so that the tension communicated via the stud between the base housing and the center portion of the mirror housing is changed, and the center portion of the mirror support housing is translated along the axis of mirror deflection.

11. The cavity length controller of claim 10 wherein the mirror support housing is fabricated from a low-expansion ceramic glass having a positive coefficient of thermal expansion, the base housing and nut are fabricated from a nickel-iron alloy, and the stud is fabricated from an iron-nickel-cobalt alloy.

12. The cavity length controller of claim 10 wherein the mirror support housing is fabricated from a low-expansion ceramic glass having a negative coefficient of thermal expansion, the base housing and nut are fabricated from an iron-nickel-cobalt alloy, and the stud is fabricated from a nickel-iron alloy.

13. The cavity length controller of claims 1, 2, 3, 4, 5, 6, 7, 8, 9, 10, or 11 wherein the rear surface of the mirror support housing is non-reflective and an external mirror is affixed to the center of that surface.

* * * * *